United States Patent [19]

Leung et al.

[11] Patent Number: 5,374,801
[45] Date of Patent: Dec. 20, 1994

[54] PLASMA HEATING FOR CONTAINERLESS AND MICROGRAVITY MATERIALS PROCESSING

[75] Inventors: Emily W. Leung, La Canada; Kin F. Man, Arcadia, both of Calif.

[73] Assignee: The United States of America as represented by the Administrator of the National Aeronautics and Space Administration, Washington, D.C.

[21] Appl. No.: 153,933

[22] Filed: Nov. 15, 1993

[51] Int. Cl.$^5$ .............................................. B23K 10/00
[52] U.S. Cl. ................... 219/121.36; 219/123; 219/121.52; 219/121.59; 361/144
[58] Field of Search ............... 219/121.36, 121.52, 219/121.48, 121.59, 7.5, 10.67, 123; 156/345, DIG. 62; 164/467, 503, 502; 373/18–22, 166; 361/144

[56] References Cited

U.S. PATENT DOCUMENTS

| | | |
|---|---|---|
| 3,158,729 | 11/1964 | Gross . |
| 3,937,917 | 2/1976 | Consoli . |
| 4,301,352 | 11/1981 | Shipai et al. ................ 219/121.52 |
| 4,555,611 | 11/1985 | Moll . |
| 4,578,552 | 3/1986 | Mortimer . |
| 4,745,338 | 5/1988 | Hollis, Jr. et al. . |
| 4,769,101 | 9/1988 | dos Santos Pereiro Ribeiro ................ 156/345 |
| 4,959,841 | 9/1990 | Johnson et al. . |
| 4,979,182 | 12/1990 | Lohoefer . |
| 4,982,796 | 1/1991 | Lasi et al. ................ 164/467 |
| 5,132,511 | 7/1992 | Labrot et al. . |
| 5,150,272 | 9/1992 | Danley et al. . |
| 5,155,651 | 10/1992 | Yoda et al. . |
| 5,196,999 | 3/1993 | Abe . |
| 5,217,565 | 6/1993 | Kou et al. ................ 156/620.4 |
| 5,247,144 | 9/1993 | Abe ................ 219/7.5 |
| 5,267,091 | 11/1993 | Chen ................ 359/872 |

Primary Examiner—Mark H. Paschall
Attorney, Agent, or Firm—John H. Kusmiss; Thomas H. Jones; Guy M. Miller

[57] ABSTRACT

A method for plasma heating of levitated samples for containerless microgravity processing is disclosed. A sample is levitated by electrostatic, electromagnetic, aerodynamic, or acoustic systems, as is appropriate for the physical properties of the particular sample. The sample is heated by a plasma torch at atmospheric pressure. A ground plate is provided to help direct the plasma towards the sample. In addition, Helmholtz coils are provided to produce a magnetic field that can be used to spiral the plasma around the sample. The plasma heating system is oriented such that it does not interfere with the levitation system.

27 Claims, 4 Drawing Sheets

PLASMA HEATING FOR CONTAINERLESS AND MICROGRAVITY MATERIALS PROCESSING

ORIGIN OF THE INVENTION

The invention described herein was made in the performance of work under a NASA contract, and is subject to the provisions of Public Law 96-517 (35 U.S.C. §202) in which the Contractor has elected not to retain title.

TECHNICAL FIELD

The present invention relates to an improved method for containerless heating and processing of materials, especially under microgravity conditions such as are found in space. More particularly, the method relates to novel uses of a plasma torch for sample heating and processing.

BACKGROUND ART

Plasma torches are well-known tools for heating, welding, and cutting a variety of materials. U.S. Pat. No. 3,158,729 to Gross teaches a plasma torch design in which inert gas is ionized by a metal rod to which a high-frequency and high-voltage current source is connected. More often a plasma arc is established between two tubular electrodes by a high-voltage direct current source. The arc is often controlled or modified by a magnetic field created around the electrodes. Such a structure is taught by U.S. Pat. No. 5,132,511 to Labrot et al.

The inert gas which becomes ionized to form miasma usually flows through the torch at high velocity, and thus may carry the plasma "flame" to the object to be heated. In many applications a transferred arc configuration is used. In that situation, the sample must be conductive and is connected to the power source to become part of the anode of the torch. Then the plasma flows directly to the sample, thus heating it. If the sample is nonconductive, or if it is not feasible to connect the sample into the circuit, a nontransferred arc torch must be used. There, inert gas flow and an additional magnetic field are used to force the plasma "flame" to impinge on the sample. However, heating efficiency is often drastically reduced due to an electric charge that develops on the sample due to thermionic emissions and deflects the plasma from the sample.

Microgravity environments such as those found in orbiting satellites or space vehicles present special challenges and opportunities for plasma and other methods of sample heating. Under low gravity conditions, many materials can be purified and crystallized to yield samples with properties that cannot be obtained under normal gravity conditions. One of the advantages of the microgravity environment is that samples can be levitated and controlled readily. Normal gravity processing usually requires a container for the sample, but the ease of levitation under microgravity conditions allows containerless heat processing of samples. Containerless processing avoids both sample contamination and sample loss. Impurities picked up from the container may contaminate and affect final product quality. Also, valuable samples may be lost when sample adheres to the container during processing.

Therefore, there has been considerable attention to various methods of levitation and heating of samples for microgravity processing. U.S. Pat. No. 5,155,651 to Yoda et al. teaches an electrostatic levitator for use in microgravity experiments. U.S. Pat. No. 5,196,999 to Abe teaches an electrostatic levitation furnace in which the levitated sample is heated by electromagnetic radiation focused by an elliptical mirror. U.S. Pat. No. 4,979,182 to Lohoefer describes an electromagnetic levitator that uses four magnetic coils to levitate and heat an electrically conductive sample. U.S. Pat. No. 4,578,552 to Mortimer describes a single coil electromagnetic levitator/heater for an electrically conductive sample. U.S. Pat. No. 5,150,272 to Danley et al. teaches a plurality of separate coils for levitating and heating conductive samples.

STATEMENT OF THE INVENTION

It is an object of the present invention to provide a means for rapidly and efficiently heating samples for containerless microgravity processing.

It is a further object of the present invention to provide a heating method that works equally well with either conductive or nonconductive samples.

It is a further object to provide a heating method that is compatible with all of the commonly used means of sample levitation and positioning.

Applicants have found that heating by a plasma torch is ideal for microgravity experiments because of the extremely high temperatures that are available and because of the contamination protection afforded the heated sample by the plasma torch inert gas stream. Transferred arc plasma heating is not feasible in the context of microgravity since there is no convenient way to connect a levitated sample to the plasma power circuit.

Instead, Applicants have found that a plasma torch can be used to effectively heat a containerless sample if a ground plate is provided in proximity to the sample. The required current loop is completed when the plasma contacts the ground plate. This allows the plasma to contact and heat The sample despite any surface charges that may develop on the sample.

In a first embodiment the present invention uses a conventional direct current plasma torch that is directed towards a levitated sample. The sample can be nonconductive or conductive; conductive samples can be magnetic or nonmagnetic. Hence, the exact levitation system employed depends on the sample properties. For example, processing of a sample with magnetic properties could advantageously use an electromagnetic levitation system. The plasma heating system is compatible with all levitation systems: electromagnetic, electrostatic, aerodynamic jet, and acoustic levitators. The important factor is that a ground plate must be situated in the vicinity of the levitated sample on the opposite side of the sample from the plasma torch.

A second embodiment of the present invention is substantially the same as the first embodiment in terms of the ground plate and the levitation system. However, in this embodiment the sample is enclosed by a pair of electromagnetic Helmholtz coils. These coils produce a magnetic field which directs the plasma towards the sample and the ground plate. This arrangement can draw out the plasma "flame" farther from the torch than it might otherwise extend and direct it towards the sample and ground plate. The plasma is concentrated by the magnetic field along the axis of the coil. In addition, the magnetic field causes the plasma to spiral in close proximity to the sample. Thus, a magnetic field can assure improved sample contact with the plasma and faster concomitant heating.

The location of the sample and the ground plate are determined by the characteristics of the plasma torch and the length of the "flame" produced by the torch. To be effective the ground plate must interact with the plasma. Normally the ground plate is placed at approximately the greatest distance from the torch that the plasma reaches. With such a setup, the sample is normally placed halfway between the ground plate and the torch. Since the magnetic field generated by the Helmholtz coils draws out and directs the plasma, the magnetic field allows the plate to be placed farther from the torch than would otherwise be feasible.

The distances of sample and plate placement can be altered as long as the plasma can "see" the ground plate on the opposite side of the sample. That is to say, the sample must be placed between the ground plate and the torch, and the plate must be larger than the sample when viewed from the vantage point of the plasma torch. Similarly, the ground plate can have a number of different shapes and can even partially surround the sample as long as the plate can still be "seen" by the plasma and as long as the plate does not interfere with the levitation system employed. The axis of the plasma torch can be parallel or perpendicular to the axis of levitation. Multiple plasma torches can be employed to increase the speed of heating.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a method of using a plasma torch and an associated ground plate to neat a levitated sample for microgravity processing.

Figure 1:
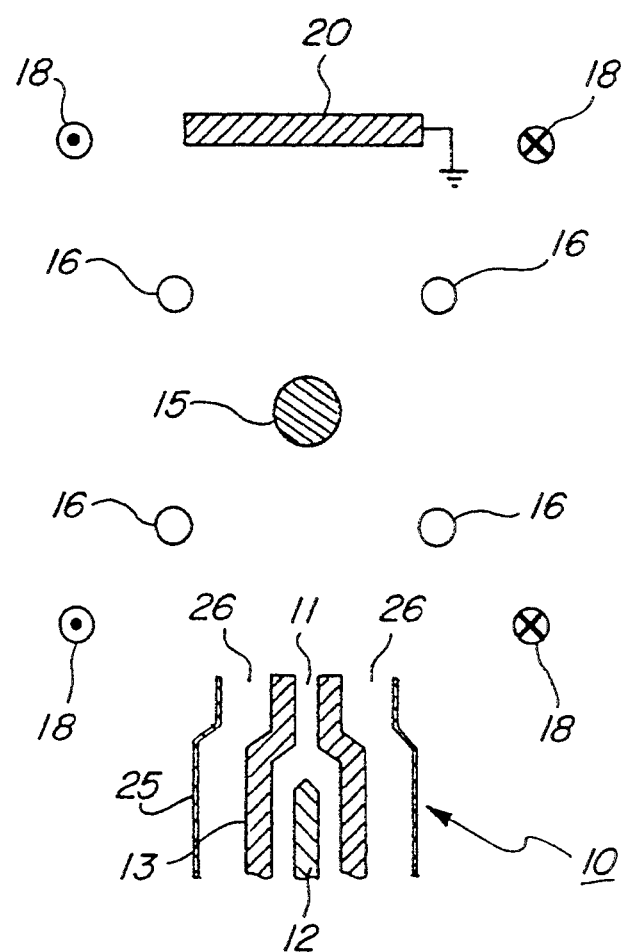
FIG. 1 is a diagrammatic representation of the present invention employing an electromagnetic levitation/positioner system.

FIG. 1 shows the present invention employing an electromagnetic levitation system 16. In this apparatus a plasma torch 10 that is used produces a flame of approximately 3 cm in length. The torch 10 is designed to operate at atmospheric pressure and uses argon as an inert plasma gas which flows out of a central passageway 11. During use the torch consumes about one liter of argon per minute. A current of 75 amperes D.C. maximum flows between a cathode 12 and an anode 13, thus ionizing the argon in the passageway 11. To stabilize the plasma and to provide further protection to the sample, the plasma torch 10 also provides an inert gas shield. This shield is produced by a concentric collar 25 that surrounds the plasma torch 10. The gas shield is emitted through opening 26. During normal operation the plasma torch 10 consumes approximately 5 liters per minute of shield gas. As explained above, the overall dimensions of the complete apparatus are determined by the size of the plasma flame. Similar plasma torches are readily available with "flames" of up to about 18 cm in length. Thus, the apparatus could be readily scaled up at least sixfold.

The plasma torch 10 is situated at one end of a space defined by Helmholtz coils 18. At the opposite end of the space is situated ground plate 20 which is electrically connected (not shown) to the ground of the plasma torch power supply (also not shown). In this apparatus where the plasma "flame" has a maximum length of about 3 centimeters, the ground plate 20 is a round metallic disc with a diameter of about six centimeters. Approximately midway between the ground plate 20 and the plasma torch 10 is located a sample 15. Although the plasma torch 10 is capable of heating any type of material, the sample 15 in this example is levitated by electromagnetic levitation coils 16 and must, itself, be metallic or electrically conductive for the electromagnetic levitation to be effective.

To operate the apparatus the electromagnetic levitation coils 16 are first energized to levitate a solid sample 15. Then the Helmholtz coils 18 are energized and the argon flow from the plasma torch opening 11 and shield opening 26 is started. For a sample 15 of about 6 millimeters in diameter, the Helmholtz coils produce a field with a strength of about 10 gauss. The electromagnetic coils 16 are adjusted as necessary to stabilize and position the levitated sample 15. Finally, the plasma torch 10 is energized and plasma production commences. The plasma torch 10 is designed so that plasma is forced out of central passageway 11 by the flow of argon gas. The plasma "flame" thus produced is concentrated and spiralled around the sample 15 by the magnetic field generated by Helmholtz coils 18. The "flame" is also electrically attracted by ground plate 20, thus ensuring that the sample 15 is quickly and efficiently heated.

Figure 2:
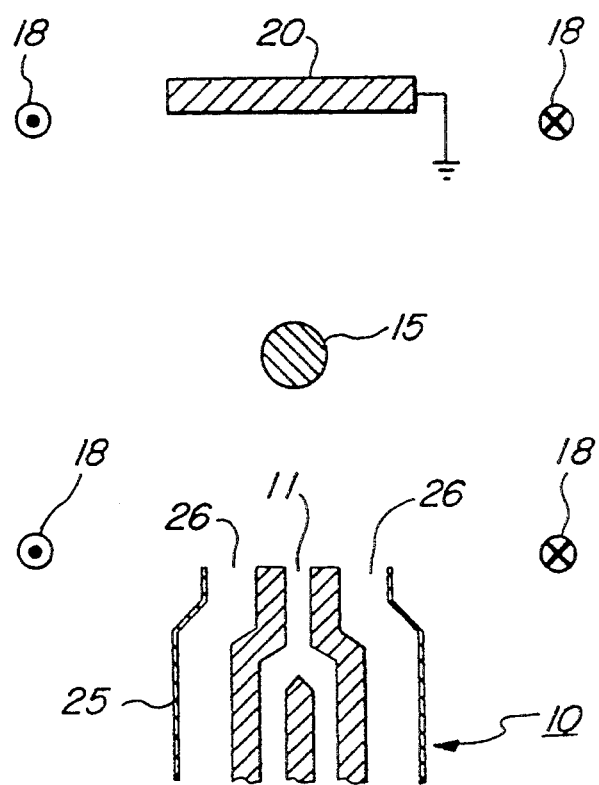
FIG. 2 is a diagrammatic representation of the present invention employing an aerodynamic levitation/positioner system.

FIG. 2 shows the present invention configured to use an aerodynamic jet to levitate and position the sample 15. Here the aerodynamic jet is actually produced by the concentric collar 25 that normally emits an inert gas shield from openings 26. Applicants have found that by increasing the flow rate of the shield sample 15 can be levitated by the gas stream. Thus, the normal torch configuration can also provide aerodynamic levitation. Generally, the levitating gas stream will be of the same composition as the inert gas used to generate the plasma, but there is no reason that a different gas cannot be used. After the sample is levitated, the plasma gas is emitted from central opening 11, the plasma torch 10 is energized, and plasma generation begins. Normally the Helmholtz coils 18 will be energized prior to or concomitantly with plasma generation.

Figure 3:
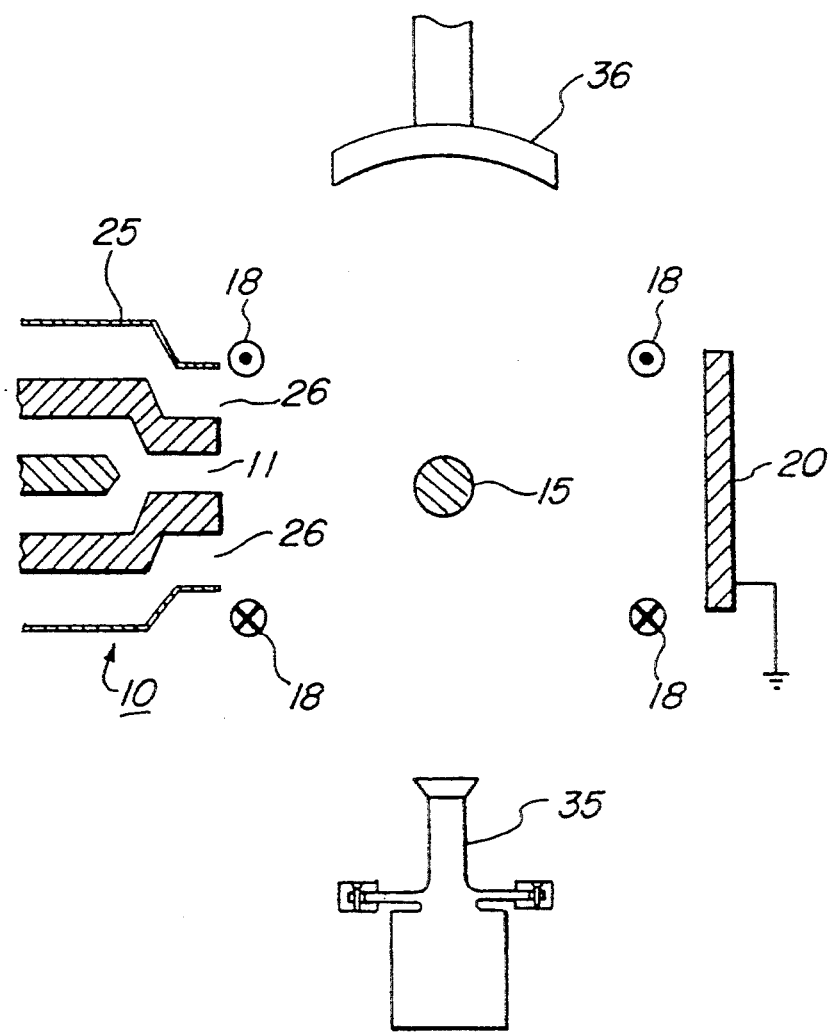
FIG. 3 is a diagrammatic representation of the present invention employing an acoustic levitation/positioner system.

In FIG. 3 an acoustic levitation system 35, 36 is used to levitate and position sample 15. The acoustic system consists of a transducer module 35 and a reflector/sensor module 36. The transducer module 35 contains a piezoelectric element that projects a beam of ultrasonic acoustic energy. The reflector/ sensor module 36 senses the acoustic energy and generates a control signal to modulate the output of the transducer module 35. At the same time the reflector/sensor 36 reflects the beam back towards the transducer 35, thereby setting up standing waves. The sample becomes captured in a node of the standing waves and is held between the transducer 35 and the reflector/sensor 36. It is not convenient to position the acoustic levitation system 35, 36 on the same axis as the plasma torch 10 and the ground plate 20; therefore, the plasma torch 10 and ground plate 20 axis are perpendicular to the axis of the acoustic levitation system 35, 36.

Figure 4:
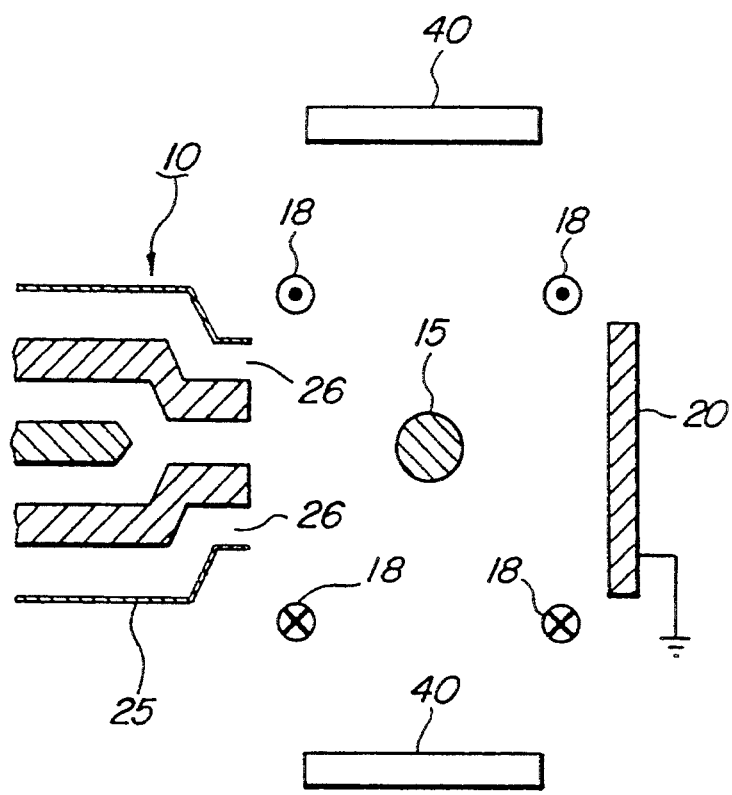
FIG. 4 is a diagrammatic representation of the present invention employing an electrostatic levitation/positioner system.

Finally, FIG. 4 shows the present invention using an electrostatic levitator electrodes 40 to levitate the sample 15. It is difficult to locate the electrostatic levitation system on the same axis as the plasma torch 10 and ground plate 20. Therefore, an axis normal to the electrostatic electrodes 40 is perpendicular to an axis of cylindrical symmetry through the plasma torch 10 and ground plate 20. Although the electrostatic system is shown diagrammatically as simple plate-type electrodes 40, it actually consists of more complex compound electrodes which allow more accurate fine positioning of the sample 15.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. A method for heating a sample without a container comprising the steps of:
   providing a sample to be heated;
   levitating the sample;
   providing at least one plasma torch to produce a plasma flame;
   providing a ground plate near but physically separated from the sample and arranged so that the levitated sample is disposed between the plasma torch and the ground plate; and
   providing a direct current magnetic field in a region including the levitated sample, so that the plasma flame is directed towards the ground plate by the magnetic field and the magnetic field also concentrates the plasma flame in the vicinity of the sample for more effective heating.

2. The method of claim 1 wherein the sample is levitated by a levitating device selected from a group comprising an electromagnetic levitation device, an electrostatic levitation device, an acoustic levitation device, and an aerodynamic levitation device.

3. The method of claim 1 wherein a pair of Helmholtz coils produce the direct current magnetic field.

4. The method of claim 1 wherein a plurality of plasma torches are provided with the sample disposed between the torches and the ground plate.

5. The method of claim 1 wherein the ground plate is substantially flat.

6. The method of claim 1 wherein the ground plate is cup shaped and partially surrounds the sample.

7. A method for heating a sample without a container comprising the steps of:
   providing a sample to be heated;
   levitating the sample;
   providing at least one plasma torch to produce a plasma flame; and
   providing a ground plate near but physically separated from the sample and arranged so that the levitated sample is disposed between the plasma torch and the ground plate,
so that the plasma flame will be drawn past the levitated sample to the ground plate, thereby heating the sample.

8. The method of claim 7 wherein the sample is levitated by a levitation device selected from a group comprising an electromagnetic levitation device, an electrostatic levitation device, an acoustic levitation device, and an aerodynamic levitation device.

9. The method of claim 7 further containing the step of providing a set of Helmholtz coils to produce a direct current magnetic field in a region including the levitated sample.

10. The method of claim 7 wherein a plurality of plasma torches are provided with the sample disposed between the torches and the ground plate.

11. The method of claim 7 wherein the ground plate is substantially flat.

12. The method of claim 7 wherein the ground plate is cup shaped and partially surrounds the sample.

13. A method for heating a sample without a container comprising the steps of:
   providing a sample to be heated;
   using an electrostatic levitation device to levitate the sample;
   providing a direct current plasma torch to produce a plasma flame; and
   providing a ground plate near but physically separated from the sample and arranged so that the levitated sample is disposed between the plasma torch and the ground plate,
so that the plasma flame will be drawn past the levitated sample to the ground plate, thereby heating the sample.

14. The method of claim 13 further containing the step of providing a set of Helmholtz coils to produce a direct current magnetic field in a/region including the levitated sample.

15. A method for heating a sample without a container comprising the steps of:
   providing a sample to be heated;
   using an electrostatic levitation device to levitate the sample;
   providing a direct current plasma torch to produce a plasma flame;
   providing a ground plate near but physically separated from the sample and arranged so that the levitated sample is disposed between the plasma torch and the ground plate; and
   using a pair of Helmholtz coils to produce a direct current magnetic field in a region including the levitated sample,
so that plasma flame is directed towards the ground plate by the magnetic field and the magnetic field also concentrates the plasma flame in the vicinity of the sample for more effective heating.

16. A device for heating a sample without a container comprising:
   means for levitating the sample;
   at least one plasma torch; and
   a ground plate near but physically separated from the sample and arranged so that the levitated sample is disposed between the plasma torch and the ground plate.

17. The device of claim 16 wherein the means for levitating the sample is selected from a group comprising an electromagnetic levitation device, an electrostatic levitation device, an acoustic levitation device, and an aerodynamic levitation device.

18. The device of claim 16 wherein the device also comprises a pair of Helmholtz coils to produce a direct current magnetic field to concentrate the plasma around the sample.

19. The device of claim 16 wherein a plurality of plasma torches are used to heat the sample.

20. The device of claim 16 wherein the ground plate is substantially flat.

21. The device of claim 16 wherein the ground plate is cup shaped and partially surrounds the sample.

22. A device for heating a sample without a container comprising:
   an electromagnetic sample levitator;
   a direct current plasma torch;
   a ground plate near but physically separated from the sample and arranged so that the levitated sample is disposed between the plasma torch and the ground plate; and
   a pair of Helmholtz coils to produce a direct current magnetic field in a region including the sample.

23. A device for heating a sample without a container under microgravity conditions, the device comprising:
   means for levitating the sample;
   a direct current plasma torch for producing a plasma flame from an electrical discharge and a flow of inert gas; and
   a ground plate near but physically separated from the sample, disposed so that the levitated sample is between the plasma torch and the ground plate so that surface electrical charge is removed from the sample and the plasma flame is drawn towards and contacts the sample, thereby ensuring rapid and uniform sample heating.

24. The device of claim 23, further comprising Helmholtz coils surrounding the sample to produce a direct current magnetic field in a region including the levitated sample to concentrate the plasma flame around the sample.

25. The device of claim 23, wherein the means to levitate the sample is selected from a group consisting of an electromagnetic levitation device, an electrostatic levitation device, an acoustic levitation device and an aerodynamic levitation device.

26. A device for heating a sample without a container under microgravity conditions, the device comprising:
   means for levitating the sample;
   a direct current plasma torch for producing a plasma flame from an electrical discharge and a flow of inert gas;
   Helmholtz coils surrounding the sample to produce a direct current magnetic field in a region including the levitated sample to concentrate the plasma flame around the sample; and
   a ground plate near but physically separated from the sample, disposed so that the levitated sample is between the plasma torch and the ground plate so that surface electrical charge is removed from the sample and the plasma flame is drawn towards and contacts the sample, thereby ensuring rapid and uniform sample heating.

27. The device of claim 26, wherein the means to levitate the sample is selected from a group consisting of an electromagnetic levitation device, an electrostatic levitation device, an acoustic levitation device and an aerodynamic levitation device.

* * * * *